United States Patent
Stanfield et al.

(10) Patent No.: US 10,998,805 B2
(45) Date of Patent: May 4, 2021

(54) POWER TOOL WITH DIRECTION SENSING CONTROLLER

(71) Applicant: BLACK & DECKER INC., Newark, DE (US)

(72) Inventors: Curtis Stanfield, Lutherville, MD (US); Wong Kun Ng, Cockeysville, MD (US)

(73) Assignee: Black & Decker Inc., New Britain, CT (US)

( * ) Notice: Subject to any disclaimer, the term of this patent is extended or adjusted under 35 U.S.C. 154(b) by 1484 days.

(21) Appl. No.: 14/806,979

(22) Filed: Jul. 23, 2015

(65) Prior Publication Data

US 2017/0025934 A1    Jan. 26, 2017

(51) Int. Cl.
| | |
|---|---|
| *H02K 5/00* | (2006.01) |
| *H02K 23/66* | (2006.01) |
| *B25F 5/00* | (2006.01) |
| *H02K 11/28* | (2016.01) |
| *H02K 7/14* | (2006.01) |

(52) U.S. Cl.
CPC .............. *H02K 23/66* (2013.01); *B25F 5/00* (2013.01); *H02K 7/145* (2013.01); *H02K 11/28* (2016.01)

(58) Field of Classification Search
CPC .......... H02K 3/28; H02K 3/522; H02K 5/225; H02K 7/145; H02K 9/06; H02K 21/12; H02K 11/21; H02K 9/22; H02K 11/20; H02K 11/215; H02K 11/22; H02K 1/276; H02K 7/116; H02K 2203/09; H02K 21/16
See application file for complete search history.

(56) References Cited

U.S. PATENT DOCUMENTS

| | | | |
|---|---|---|---|
| 3,569,753 A | 3/1971 | Babikyan | |
| 3,614,616 A | 10/1971 | Bucek et al. | |
| 3,656,040 A | 4/1972 | Babikyan | |
| 4,142,153 A | 2/1979 | Smith | |
| 5,089,729 A | 2/1992 | Moores, Jr. | |
| 5,552,684 A | 9/1996 | Wada et al. | |
| 5,777,217 A | 7/1998 | Misato et al. | |
| 7,148,433 B1 | 12/2006 | Rudy, Jr. | |
| 7,965,053 B2 | 6/2011 | Borisavljevic | |
| 8,587,230 B2 | 11/2013 | Pant et al. | |
| 9,718,180 B2 * | 8/2017 | Hester | B25F 5/008 |
| 9,847,194 B2 * | 12/2017 | Ekstrom | H01H 21/12 |

(Continued)

FOREIGN PATENT DOCUMENTS

| | | |
|---|---|---|
| EP | 2524773 | 11/2012 |
| EP | 2589465 | 5/2013 |

(Continued)

OTHER PUBLICATIONS

EP Search Report dated Nov. 16, 2016 for EP Application No. 16180572.6.

*Primary Examiner* — Tran N Nguyen
*Assistant Examiner* — Leda T Pham
(74) *Attorney, Agent, or Firm* — Stephen R. Valancius

(57) ABSTRACT

A power tool with a motor which is rotatable in a forward direction and a reverse direction. A tool holder is driven by the motor. The power tool has a user operable trigger for operating the motor, a reversing switch for choosing the direction of rotation of the motor and a controller. The controller determines a direction of rotation of the motor based on a characteristic of the motor.

19 Claims, 6 Drawing Sheets

(56) References Cited

U.S. PATENT DOCUMENTS

| | | | | |
|---|---|---|---|---|
| 2012/0292067 | A1* | 11/2012 | Velderman | B25F 5/00 |
| | | | | 173/170 |
| 2013/0270932 | A1* | 10/2013 | Hatfield | H02K 3/522 |
| | | | | 310/50 |
| 2013/0327552 | A1 | 12/2013 | Lovelass et al. | |
| 2014/0102742 | A1 | 4/2014 | Eshleman et al. | |
| 2014/0262389 | A1 | 9/2014 | Simeone et al. | |
| 2015/0015104 | A1* | 1/2015 | Kataoka | H02K 7/06 |
| | | | | 310/80 |

FOREIGN PATENT DOCUMENTS

| | | |
|---|---|---|
| EP | 2674262 | 12/2013 |
| WO | WO2015045740 | 4/2015 |

\* cited by examiner

POWER TOOL WITH DIRECTION SENSING CONTROLLER

FIELD

The present disclosure relates to portable hand held power tools including drills and drill drivers.

BACKGROUND

It is known to provide a power tool with switches, knobs, and other controls. For example, a power drill or driver typically includes a trigger that the user actuates to cause rotation of a tool held in a chuck. Power drills or drivers also typically include a forward/reverse selector switch located near the trigger that the user actuates to change a rotation direction of the tool. Some power drills or drivers also include a clutch control (e.g., a dial) that is used to change a clutch torque setting such that the amount of resistance necessary to stop rotation of the chuck can be set or changed by the user.

This section provides background information related to the present disclosure which is not necessarily prior art.

SUMMARY

This section provides a general summary of the disclosure, and is not a comprehensive disclosure of its full scope or all of its features.

According to one exemplary aspect, there is a power tool including a motor configured to be rotatable in a forward direction and a reverse direction, a tool holder driven by the motor, a user operable trigger for operating the motor, a reversing switch for choosing the direction of rotation of the motor and a controller. The controller is configured to determine a direction of rotation of the motor based on a characteristic of the motor.

The tool holder may include a chuck.

The power tool may include a transmission between the motor and the chuck.

The characteristic of the motor may be voltage.

The controller may be configured to operate the motor in accordance with the determined direction of rotation of the motor.

The controller may be configured to operate the motor according to a first control scheme when the motor is operating in a forward direction and a second control scheme when the motor is operating in a reverse direction.

The controller may be configured to control operation of the motor.

The power tool may further include a motor controller and the controller may controls driving of the motor through the motor controller.

The power tool may be a drill.

According to another exemplary aspect, there is a power tool including a motor configured to be rotatable in a forward direction and a reverse direction, a trigger switch for operating the motor, a user operable reversing switch for choosing the direction of rotation of the motor, and a controller. The controller is configured to receive a signal from the motor.

The controller may be configured to receive a signal from the trigger switch.

The controller may be configured to determine a direction of rotation of the motor based upon the signal received from the motor.

The signal received from the motor may be a motor voltage signal.

The controller may determine the direction of rotation of the motor after voltage is applied to the motor.

The controller may be configured to operate the power tool in a start-up mode when the signal is first received from the trigger indicating that the trigger switch has been closed.

The controller may be configured to operate the power tool in an operating mode, different than the start-up mode, after the controller determines the direction of rotation of the motor.

The power tool may further include a tool holder driven by the motor.

According to another exemplary aspect, there is a power tool including a motor configured to be rotatable in a forward direction and a reverse direction, a power source, a reversing box located between the power source and the motor such that the power source is at a first side of the reversing box and the motor is at a second side of the reversing box and a controller. the controller being operatively coupled to the first side to receive a first side signal from the first side, the controller also being operatively coupled to the second side to provide a second side signal to the second side.

The controller may determine the direction of rotation of the motor based on the first side signal.

The controller may drive the motor via the second side signal.

The power tool may further include a motor controller between the power source and the reversing box and the controller may drive the motor via the motor controller.

The power tool may further include at least one of a tool and a tool holder driven by the motor.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
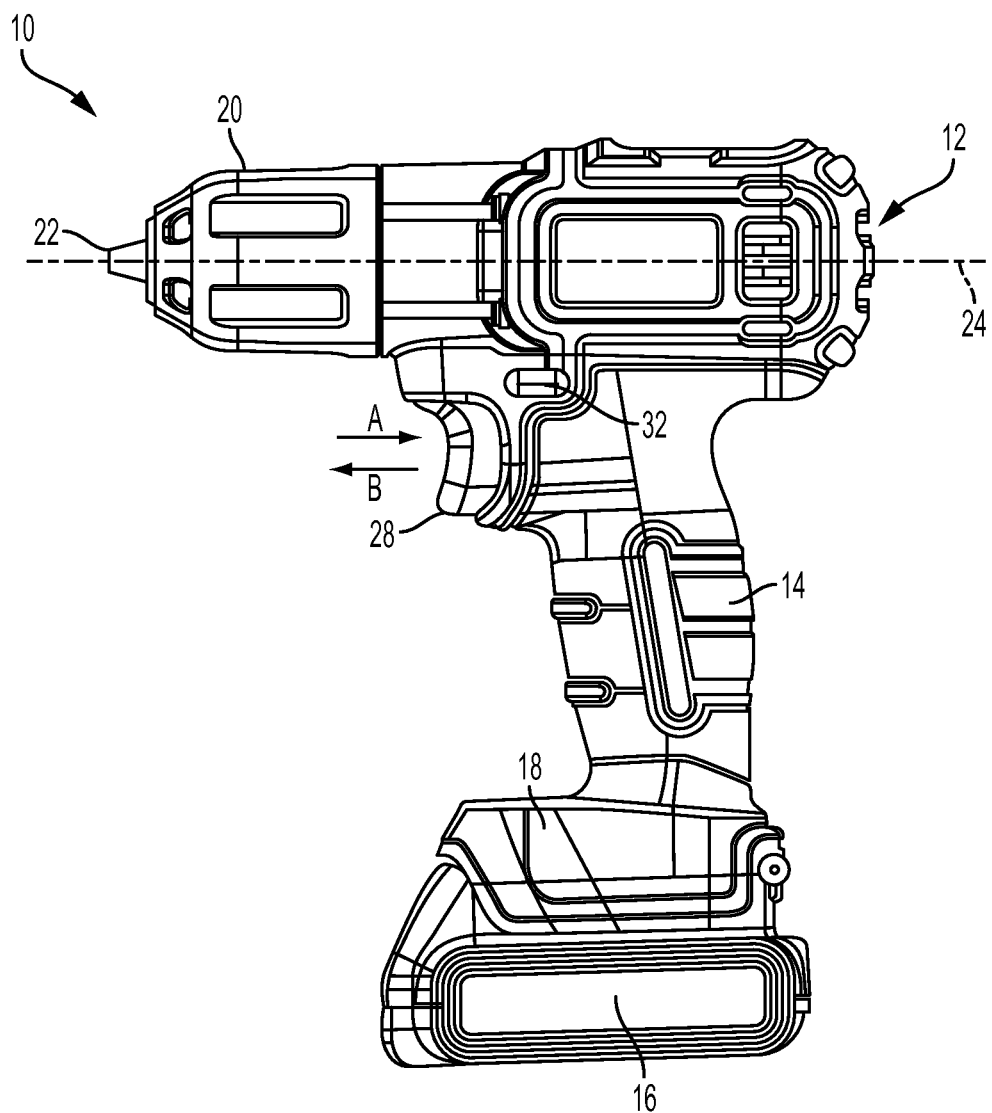
FIG. 1 is a front left perspective view of an exemplary embodiment of a drill/driver of the present disclosure.

Referring to FIG. 1, a portable hand-held power tool which in one form is a drill driver 10 includes a body 12 having a handle 14 shaped to be grasped in a single hand of a user, a rechargeable battery pack 16 that is releasably connected to a battery mounting portion 18 of body 12, and a chuck 20 having two or more jaws 22 which are axially rotated with respect to a rotational axis 24. The jaws 22 of the chuck 20 may hold a drill bit or other tool or implement. While the following description is provided with reference to a drill driver, it is readily understood that some of the features set forth below are applicable to other types of power tools, such as an impact driver. In the case of an impact driver, for example, a hex chuck would typically be used as a bit holder for holding the tool bit.

A manually depressible and return biased trigger 28 is provided to initiate and control operation of drill driver 10. Trigger 28 is operated by manually depressing in a trigger engagement direction "A" and returns in a trigger release direction "B" upon release. Positioned adjacent to trigger 28 is a forward/reverse selector switch 32. A portion of the forward/reverse selector switch 32 extends freely outwardly the left hand side of body 12. A similar portion extends freely outwardly from the right hand side of body 12. The forward/reverse selector switch 32 can be toggled by the user to select a direction of rotation of the motor and therefore the chuck 20 and jaws 22. The selector switch 32 is connected to a reversing box 130, as shown and described below. Reversing boxes are generally known in the art, and an example is shown in, for example, U.S. Pat. No. 7,148,433, which is herein incorporated by reference.

Figure 2:
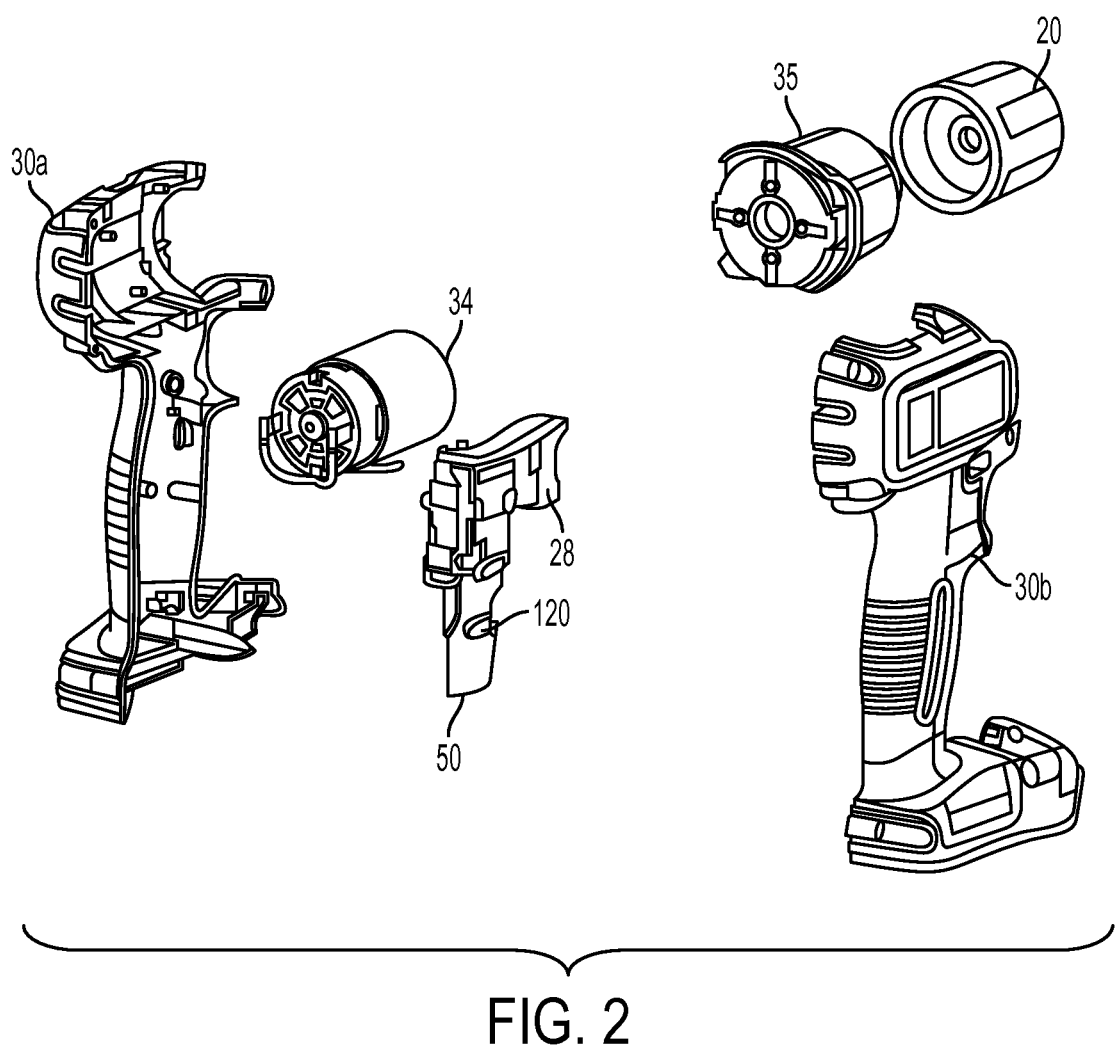
FIG. 2 is an exploded view of the drill/driver of FIG. 1.

FIG. 2 is an exploded view of the drill. As shown in FIG. 2, the drill body 12 is made out of a first housing part 30*a* and a second housing part 30*b*. The drill 10 further includes a DC motor 34 and a motor transmission 35, the motor 34 operable using DC current from battery pack 16 and controlled by trigger 28. Motor 34 and motor transmission 35 are mounted in the body 12 and are drivably connected to chuck 20 for rotation of chuck 20. It is readily understood that broader aspects of this disclosure are applicable to corded tool as well as battery powered tools.

As previously discussed, the drill has a reversing switch 32, as shown in FIG. 1. The selector switch 32 connects to the reversing lever 33 shown in FIG. 2 such that pushing the selector switch 32 from one side to the other also toggles the reversing lever 33 from one side to the other. The reversing lever 33 is in turn connected to the reversing box 130 which is part of the switch assembly 50. Accordingly, when a user toggles the selector switch 32, the reversing box 130 is toggled between a forward and reverse setting.

A printed circuit board (PCB) 40 is positioned in handle 14. PCB 40 defines an electronic control circuit and includes multiple components including a microcontroller 120 such as a microchip, having a central processing unit (CPU) or the like for performing multiple functions of drill driver 10, at least one electrically erasable programmable read-only memory (EEPROM) function providing storage of data or selected inputs from the user of drill driver 10, and at least one memory device function for storing both temporarily and permanently saved data such as data lookup tables, torque values and the like for use by drill driver 10. According to other aspects (not shown), microcontroller 120 can be comprised of separate components including a microprocessor, at least one EEPROM, and at least one memory device.

Figure 3:
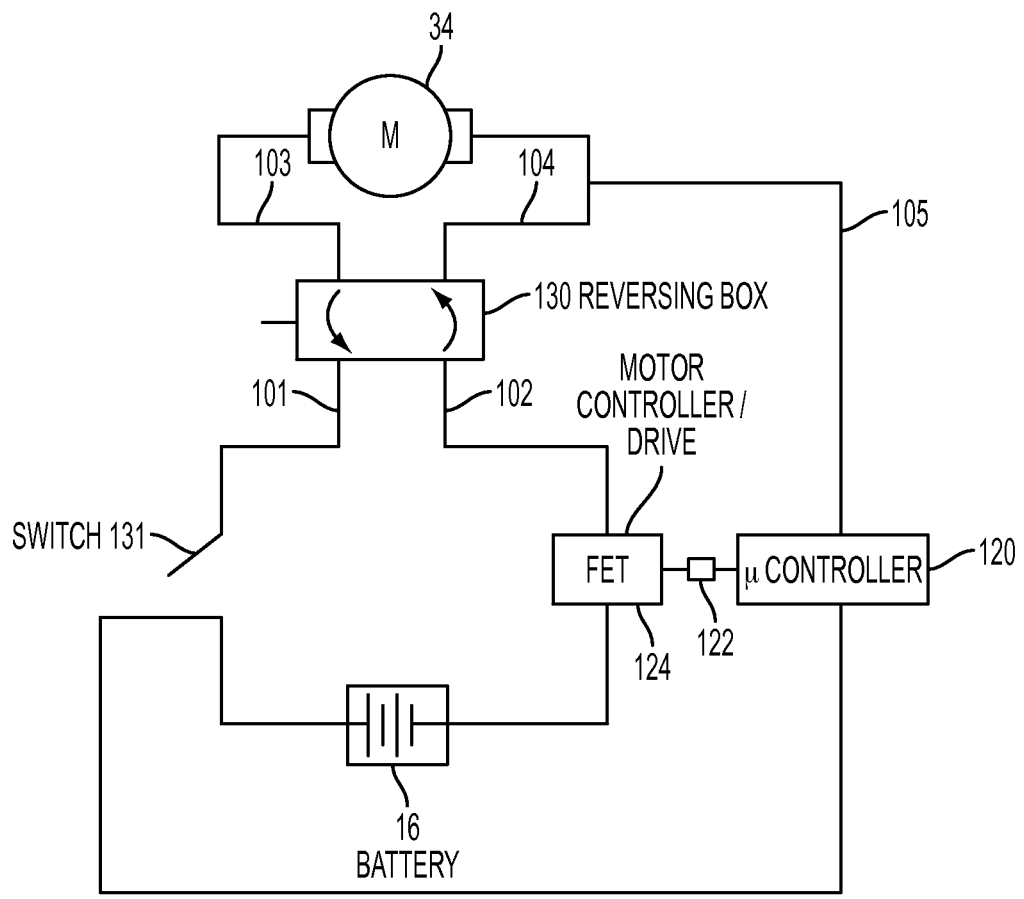
FIG. 3 is a schematic illustration of the drill/driver of FIG. 1.

FIG. 3 is a schematic illustration of the drill. As shown in the diagram, the drill 10 includes a battery 16 which serves as a power source and provides voltage to the motor 34. When the user activates trigger 28, the trigger closes switch 131. When the switch 131 is closed, the battery 16 provides a voltage through the reversing box 130 to the motor. Particularly, as show in FIG. 3, closing the switch 131 closes the circuit between the battery 16 and the motor 34. Closing the switch 131 also provides a signal to the microcontroller 120. When the microcontroller 120 receives a signal that the switch 131 is closed, the microcontroller 120 provides a signal to the motor controller 122. The motor controller 122 then drives a FET 124 to control the motor 34 with a pulse width modulation (PWM). The microcontroller 120 controls the motor controller 122 to drive the motor 34 at a PWM according to the amount the trigger 28 so that the drill 10 is operated with a variable speed.

As shown in FIG. 3, there are two lines 101, 102 coming into the reversing box 130 and two lines 103, 104 exiting the reversing box 130. Voltage from the battery 16 travels through the reversing box 130 to the motor 34 in order to power the motor 34. The reversing box 130 may be toggled by use of the selector switch 32 to reverse the polarity passed through to the motor 34. In turn, reversing the polarity changes the direction of operation of the motor 34. Accordingly, a user operating the selector switch 32 changes the reversing box 130, which switches the polarity of the electricity provided to the motor 34 and the direction or rotation of the motor 34. In the drill 10 shown in FIG. 1, the reverse direction is a counter-clockwise direction and the forward direction is a clockwise direction.

Figure 4:
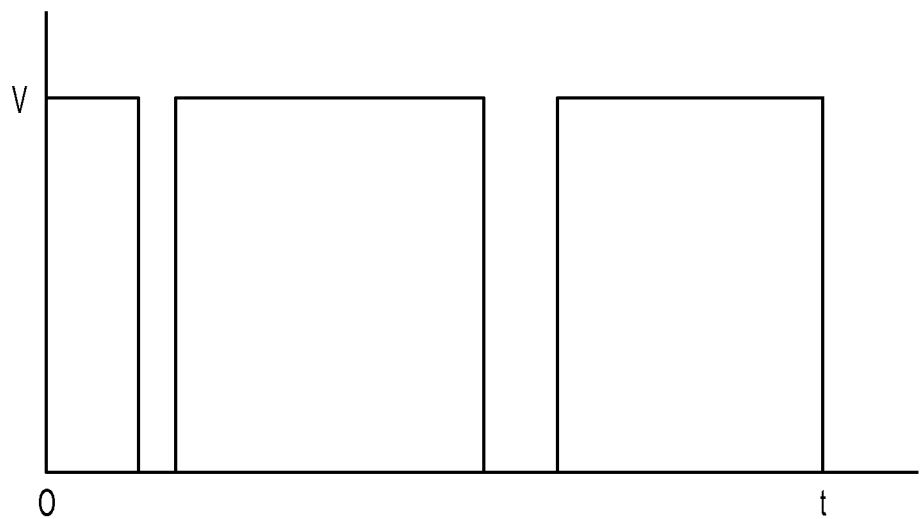
FIG. 4 is a graph of voltage over time measured by a controller of the drill/driver

As shown in FIG. 3, there is also a line 105 on one side of the motor 34 which connects to a microcontroller 120. The line 105 provides an indication of the motor voltage. As shown in FIG. 3, the lead line 105 is connected to the lead line 104. When the reversing box 130 is in a forward direction, the lead line 104 is connected to the lead line 102, which includes the FET 124. Alternatively, when the reversing box 130 is switched to the reverse direction, the line 104 is connected to the lead line 101, which is connected directly to the battery 16 without the FET 124 located between it and the battery 16. Accordingly, when in the forward direction, line 102 is connected to line 104 and the reading of line 105 is of voltage coming from the battery 16 through the FET 124. The voltage through the FET 124 will be high and low as the FET is turned on and off, respectively. FIG. 4 illustrates a motor voltage (V) over time (t) when the motor is rotating in a forward direction. As shown in FIG. 4, the voltage read in the forward direction is both high and low.

Figure 5:
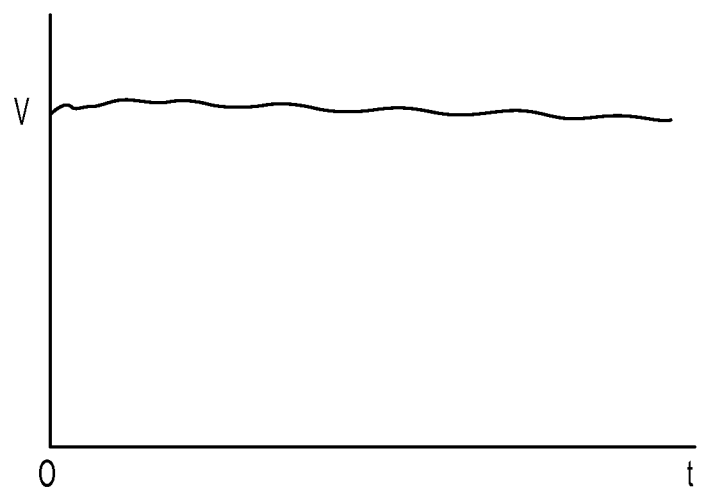
FIG. 5 is another graph of voltage over time measured by a controller of the drill/driver.

On the other hand, when the reversing box 130 is in a reverse direction, the lead line 101 is connected to line 104 and line 102 is connected to 103. In this instance, the reading of line 105 off of line 104 is connected to the battery 16 without the FET 124 being disposed between the line 105 and the battery 16. Accordingly, the voltage read by the line 105 when the motor is in reverse is not affected by the FET 124 being turned on and off. FIG. 5 shows a motor voltage over time when the motor is rotating in a forward direction. As shown in FIGS. 4 and 5, the motor voltage only reaches zero, or near zero, when the motor 34 is being driven in a forward direction. The microcontroller 120 therefore can determine if the motor 34 is operating in forward or reverse depending upon whether it receives a voltage reading of zero.

As can be appreciated, the microcontroller 120 cannot determine the selection of the reversing box 130 and, therefore, the direction of rotation of the motor 34 when the drill 10 is initially started. Accordingly, the drill may initially be operated in a start-up mode. For example, the microcontroller 120 may operate the motor driver 122 to drive the FET 124 at a PWM of 60% for 10 milliseconds (ms) upon start-up. This amount of time is less than the reaction time of a human operator and changes in operation of the drill 10 in this time will generally not be noticed. The PWM amount and time of the startup may be different than the example given above. For example, the PWM may be, for example, 99% or less, 90% or less, 80% or less, 70% or less 60% or less, 50% or less, or 40% or less. The start-up mode time may be, for example, 50 ms or less, 40 ms or less, 30 ms or less, 25 ms or less, 20 ms or less or 10 ms or less.

Figure 6:
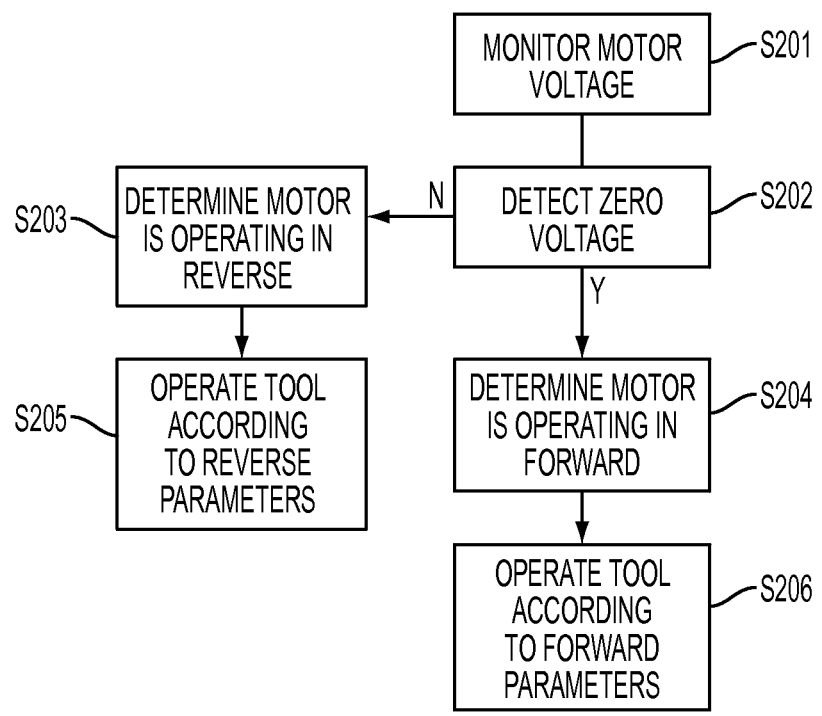
FIG. 6 is a flowchart illustrating operation of the drill.

FIG. 6 diagrams the process of the microcontroller 120 determining whether the motor 34 is operating in a forward or reverse direction. First, in step S201, the microcontroller 120 monitors a motor voltage. As shown in FIG. 3, this voltage is provided to the microcontroller 120 along line 105. In step S202, the microcontroller 120 determines whether a zero voltage is detected. If no zero voltage is detected, the microcontroller 120 determines that the motor 34 is rotating in a reverse direction S203. If a zero voltage is detected, the microcontroller 120 determines that the motor 34 is rotating in a forward direction S204. If the motor 34 is operating in a reverse direction S203, the microcontroller 120 can operate the drill 10 according to reverse operation parameters S205. If the motor 34 is operating in a forward direction S204, the microcontroller 120 can operate the drill 10 according to forward operation parameters S206.

There are various reasons why it may be advantageous for the microcontroller 120 to determine the operating direction of the motor 34 and various forward and reverse operating parameters. In a drill 10, as is shown in FIG. 1, the microcontroller 120 may limit the PWM to a certain amount in forward or reverse. For example, the microcontroller 120 may limit the PWM to 80% in reverse while allowing it to reach 98 or 99% when operating in the forward direction. Alternatively or additionally, the microcontroller 120 may turn off the motor 34 when the motor current or motor voltage reaches a certain limit in forward while not performing the same function in the reversing direction. For example, U.S. Pat. No. 8,919,456, which is hereby incorporated by reference, discusses various fastener driving or screw driving modes. In such cases it may be useful to include such fastener driving or screw driving operations while in forward operation, but not in reverse operation. According to the present embodiment, the microcontroller 120 can determine a direction of rotation and, therefore, the tool can be controlled to operate differently in forward and reverse.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool comprising:
   a motor configured to be rotatable in a forward direction and a reverse direction;
   a tool holder driven by the motor;
   a user operable trigger for operating the motor;
   a reversing switch for choosing the direction of rotation of the motor; and
   a controller;
   wherein the controller is configured to determine a direction of rotation of the motor based on a characteristic of the motor; and
   wherein the characteristic of the motor is voltage.

2. The power tool of claim 1, wherein the tool holder comprises a chuck.

3. The power tool of claim 1, further comprising a transmission between the motor and the chuck.

4. The power tool of claim 1, wherein the controller is configured to operate the motor in accordance with the determined direction of rotation of the motor.

5. The power tool of claim 1, wherein the controller is configured to operate the motor according to a first control scheme when the motor is operating in a forward direction and a second control scheme when the motor is operating in a reverse direction.

6. The power tool of claim 1, wherein the controller is configured to control operation of the motor.

7. The power tool of claim 5, Wherein the first control scheme comprises turning off the motor in response to at least one of a motor current and a motor voltage limit being reached.

8. The power tool of claim 6, further comprising a motor controller; and
   wherein the controller controls driving of the motor through the motor controller.

9. The power tool of claim 1, wherein the power tool is a drill.

10. A power tool comprising:
    a motor configured to be rotatable in a forward direction and a reverse direction;
    a trigger switch for operating the motor;
    a user operable reversing switch for choosing the direction of rotation of the motor; and
    a controller;
    wherein the controller is configured to receive a signal from the motor;
    wherein the controller is configured to receive a signal from the trigger switch;
    wherein the controller determines a direction of rotation of the motor based upon the signal received from the motor; and
    wherein the signal received from the motor is a motor voltage signal.

11. The power tool of claim 10, wherein the controller determines the direction of rotation of the motor after voltage is applied to the motor.

12. The power tool of claim 10, wherein the controller is configured to operate the power tool in a start-up mode when the signal is first received from the trigger indicating that the trigger switch has been closed.

13. The power tool of claim 12, wherein the controller is configured to operate the power tool in an operating mode, different than the start-up mode, after the controller determines the direction of rotation of the motor.

14. The power tool of claim 12, wherein the start-up mode comprises limiting a pulse-width modulated power provided to the motor for a predetermined period of time.

15. The power tool of claim 10, further comprising a tool holder driven by the motor.

16. A power tool comprising:
    a motor configured to be rotatable in a forward direction and a reverse direction;
    a power source;
    a reversing box located between the power source and the motor such that the power source is at a first side of the reversing box and the motor is at a second side of the reversing box; and
    a controller, the controller being operatively coupled to the first side to receive a first side signal from the first side, the controller also being operatively coupled to the second side to provide a second side signal to the second side;
    wherein power from the power source travels through the reversing box, and the reversing box is configured to deliver voltage of different polarities to the motor from the power source by mechanically toggling a flow of to the power through the reversing box; wherein the controller determines the direction of rotation of the motor based on the first side signal.

17. The power tool of claim 16, wherein the controller drives the motor via the second side signal.

18. The power tool of claim 17, further comprising a motor controller between the power source and the reversing box; and
    wherein the controller drives the motor via the motor controller.

19. The power tool of claim 17, further comprising at least one of a tool and a tool holder driven by the motor.

* * * * *